UNITED STATES PATENT OFFICE.

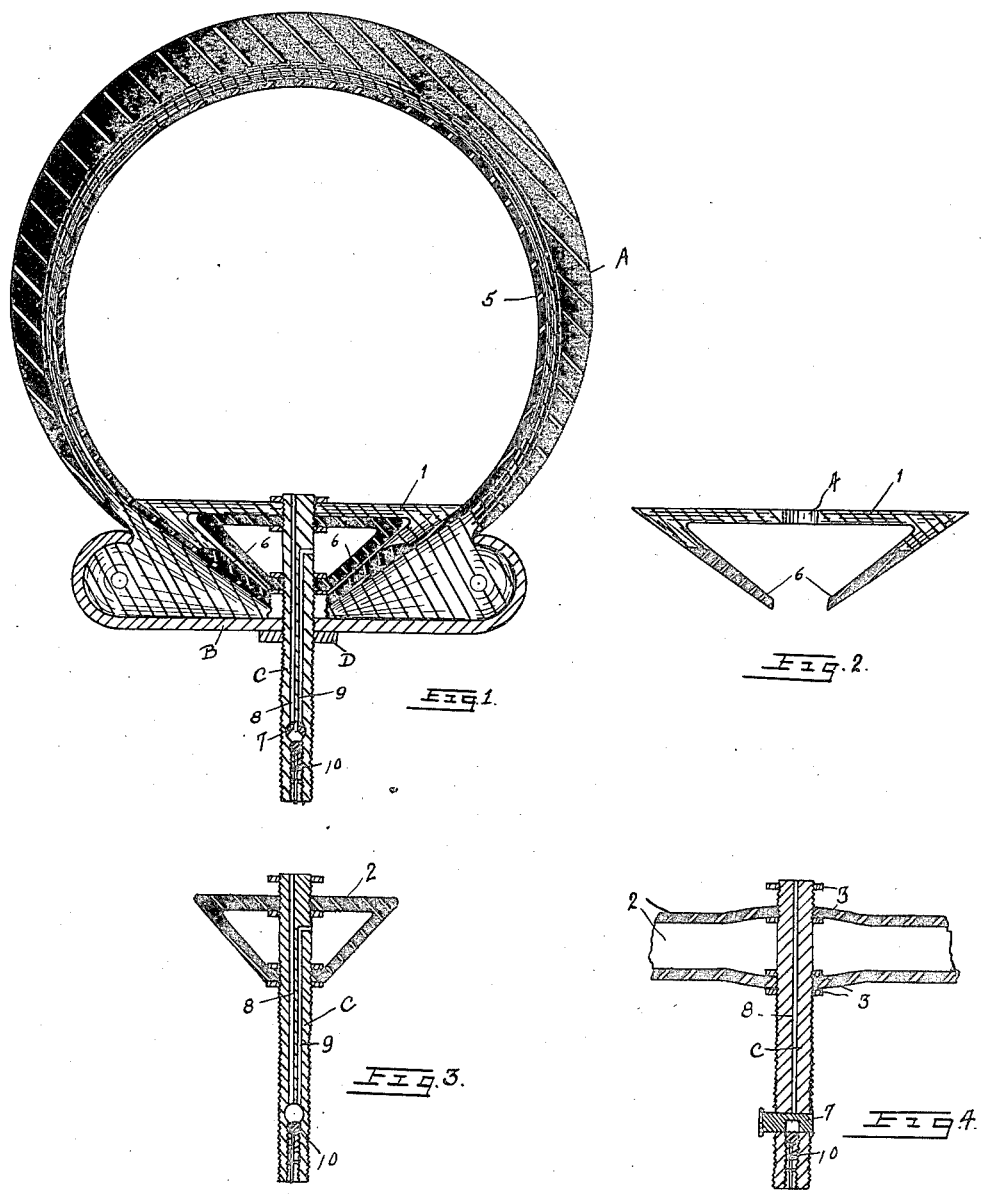

JOHN T. CLARK, OF PROVO, UTAH.

VEHICLE-WHEEL TIRE.

1,316,766.                  Specification of Letters Patent.      Patented Sept. 23, 1919.

Application filed February 6, 1919.   Serial No. 275,440.

*To all whom it may concern:*

Be it known that I, JOHN T. CLARK, a citizen of the United States, residing at Provo, in the county of Utah and State of Utah, have invented certain new and useful Improvements in Vehicle-Wheel Tires, of which the following is a specification.

My invention relates to vehicle tires, and has for its object to provide a pneumatic vehicle tire for use on road vehicles in which an inner fabric casing and an inner tube within said inner casing is inflated with compressed air to hold an inflated tread casing on the tire rim. Also to provide an air tube having valves therein by which both the inner tube and tread casing may be inflated.

These objects I accomplish with the device illustrated in the accompanying drawings in which similar letters and numerals of reference indicate like parts throughout the several figures and as described in the specification forming a part of this application and pointed out in the appended claims.

In the drawings in which I have shown a substantial embodiment of my invention Figure 1 is a radial transverse section of the tire and a longitudinal section through the air valve. Fig. 2 is a transverse section in detail of the inner casing; Fig. 3 is a longitudinal section of the air valve. Fig. 4 is another view of the air tube sectioned longitudinally and shown in place in the inner tube, parts of which are cut away.

In the said drawings the present invention is shown with the tread casing as A, and the tire rim as B, the valve stem as C and the nut to hold the said stem in place within the said tire rim as D. I use an ordinary outer casing of the clencher type as my tread casing A which is adapted for use on the ordinary tire rims B of the clencher type. On the inner wall of said tread casing A I provide a long napped lining member 5 conforming to the shape of the interior of said tread casing except that its edges do not come together. To secure and seal the said tread casing A to the tire rim B, I provide an inner casing 1, having three walls and formed into an annular form which is practically triangular in cross section, and with the edges constructed mostly of rubber as at 6 and positioned contiguous the inner wall of said tread casing A with the said rubber tipped sides 6 contacting with the edges of said tread casing. Within said inner casing 1 is the inner tube 2 made of thin flexible rubber similar to the ordinary inner tubes but much smaller and is to fit closely the interior of said inner casing 1. An air valve is provided through which to supply air to the interior of said inner tube 2 and tread casing A, which air valve consists of the stem C which is fastened radially through said inner tube 2 and a hole 4 of the inner casing 1 and held by the nuts 3 that are in turn screwed on said valve stem C. The said valve stem C is also fastened to the tire rim B by the jam nut D. The usual longitudinal bore 8 is provided in said valve stem and near the opening of said longitudinal bore the ordinary air valve 10 is provided and farther up in the said bore of said stem is provided a two way valve 7 to direct the air to or from the interior of said inner tube 2 or the interior of said tread casing A as desired. I also provide another interior bore or air channel 9 in said valve stem C connecting said two way valve 7 with the interior of said inner tube 2.

The assembling and operation of my invention is as follows:—

The valve stem is fastened through the said inner casing with the ends protruding, one end protruding only far enough to pass through the wall of said inner casing 1 at the hole 4, and on which is screwed one of said nuts 3. The inner casing 1 with the inner tube 2 therein is then inserted within the tread casing A with the edges 6 adjacent the edges of said tread casing. The tire is then placed within the tire rim B with the valve stem C through the tire rim B and the nut D screwed up. With the tire in place in the rim, compressed air is introduced through the valve stem C and with the valve 7 turned to direct the air through the bore 9 the inner tube 2 will be inflated and thereby the inner casing. As this casing is constructed to withstand any longitudinal circumferential increase the other two sides, which are contiguous the inner side and edges of the tread casing, will be forced by the pressure of said inner casing into gripping contact with the edges of said tread casing and hold the said tread casing firmly in the tire rim B. With said tread casing so held in said tire rim, the valve 7 is partially rotated and the air is cut off from the bore 9 and directed through the bore 8 into the interior of said tread casing until sufficient air is introduced. The usual check valve 10 is provided in the bore of said valve casing between said valve 7 and the end of said stem to prevent the unintentional escape of said air.

I thus provide a resilient tire with new and novel means for holding the tire in place within the rim, consisting of an inner casing having three straight walls in cross section, and an inner tube for said inner casing whereby an additional pressure may be used for the tire holding purpose and the ordinary pressure for the cushioning effect in the tread casing, with improved means of sealing the edges of said tread casing in the tire rim, one element of which consists of a long napped inner lining for said tread casing which lining is to carry a sealing fluid.

Having thus described my invention I desire to secure by Letters Patent and claim:—

1. In a wheel tire the combination with a clencher type tire rim; of a tread casing having edges adapted to engage said tire rim; an inner casing having one wall concentric with the axis of the wheel to be used within said tread casing; an inner tube to be used within said inner casing; and an air valve to direct compressed air into said inner tube or the said tread casing as desired.

2. A vehicle wheel tire comprising a tread casing having annular beads thereon near the edges; an inner casing having one wall concentric with the axis of the wheel and cutting the inner space of said tread casing in cross section as a chord and two other walls integral therewith adapted to be forced apart to contact with the inner face of said tread casing from its edges outwardly to the same chord line; and an inner air holding tube within said inner casing; with means to introduce air into said inner tube and into said tread casing as desired.

In testimony whereof I have affixed my signature.

JOHN T. CLARK.